United States Patent
Djuric et al.

(10) Patent No.: US 12,358,524 B2
(45) Date of Patent: Jul. 15, 2025

(54) PERCEPTION SYSTEM FOR AN AUTONOMOUS VEHICLE

(71) Applicant: Aurora Operations, Inc., Mountain View, CA (US)

(72) Inventors: Nemanja Djuric, Pittsburgh, PA (US); Shivam Gautam, Austin, TX (US); Peter M. Kingston, Pittsburgh, PA (US); Chi-Kuei Liu, San Mateo, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 266 days.

(21) Appl. No.: 17/953,591

(22) Filed: Sep. 27, 2022

(65) Prior Publication Data

US 2024/0103522 A1    Mar. 28, 2024

(51) Int. Cl.
*B60W 60/00* (2020.01)
*G06V 10/82* (2022.01)

(52) U.S. Cl.
CPC ........... *B60W 60/001* (2020.02); *G06V 10/82* (2022.01)

(58) Field of Classification Search
CPC . G05D 1/0221; G05D 1/0088; B60W 60/001; B60W 60/00272; G06V 10/82; G06V 20/56
See application file for complete search history.

(56) References Cited

U.S. PATENT DOCUMENTS

| | | | | |
|---|---|---|---|---|
| 9,176,500 B1 * | 11/2015 | Teller | .................... | B60W 30/08 |
| 10,421,453 B1 * | 9/2019 | Ferguson | ........ | B60W 60/00276 |
| 11,780,472 B2 * | 10/2023 | Li | .......................... | G06N 3/045 |
| | | | | 701/23 |
| 12,084,086 B2 * | 9/2024 | Zhou | ................... | G01C 21/3438 |
| 12,221,115 B1 * | 2/2025 | Blaes | ................... | G06F 18/2148 |
| 2020/0180648 A1 * | 6/2020 | Lan | .................... | B60W 30/0956 |
| 2021/0201504 A1 * | 7/2021 | Xu | ......................... | G05D 1/0221 |
| 2021/0312811 A1 * | 10/2021 | Ohlarik | ..................... | G08G 1/20 |
| 2021/0347377 A1 * | 11/2021 | Siebert | ...................... | G06N 5/04 |
| 2022/0092983 A1 * | 3/2022 | Hong | ................... | G05D 1/0278 |
| 2022/0153315 A1 * | 5/2022 | Zeng | ..................... | G06N 3/045 |

FOREIGN PATENT DOCUMENTS

WO    WO 2018/084324       5/2018
WO    WO-2021225822 A1 * 11/2021 ............ B60W 30/09

OTHER PUBLICATIONS

International Search Report and Written Opinion for Application No. PCT/US2023/033692, mailed Jan. 12, 2024, 9 pages.

* cited by examiner

*Primary Examiner* — Frederick M Brushaber

(74) *Attorney, Agent, or Firm* — Dority & Manning, P.A.

(57) ABSTRACT

An autonomous platform can obtain sensor data descriptive of an actor in an environment of an autonomous vehicle and at least a portion of the environment of the autonomous vehicle that does not include the actor, the sensor data comprising at least one sweep of the environment of the autonomous vehicle; process the sensor data with a machine-learned perception model to generate a detection of the actor and one or more predicted future velocities; and determine a motion trajectory for the autonomous vehicle based at least in part on the detection and the one or more predicted future velocities.

20 Claims, 8 Drawing Sheets

PERCEPTION SYSTEM FOR AN AUTONOMOUS VEHICLE

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Motion planning for autonomous platforms can be based on track acceleration for tasks such as decision making, costing, and feasibility checking. Many contemporary perception systems output only an instantaneous velocity and acceleration, whereas future velocities and other components of motion of actors in the environment of an autonomous platform can be predicted at downstream stages from perception. However, some planning aspects, such as merging, lane changing, etc., would especially benefit from predicted future velocities that consider a wider context of the environment than is generally available to downstream components. According to example aspects of the present disclosure, predicted future velocities can be produced by a perception model directly from multiple sweeps of sensor data and/or refined by a motion state tracker model to provide improved motion planning for autonomous platforms such as autonomous vehicles.

In an aspect, a computer-implemented method includes: (a) obtaining sensor data descriptive of (i) an actor in an environment of an autonomous vehicle and (ii) at least a portion of the environment of the autonomous vehicle that does not include the actor, the sensor data including at least one sweep of the environment of the autonomous vehicle; (b) processing the sensor data with a machine-learned perception model to generate a detection of the actor and one or more predicted future velocities; and (c) determining a motion trajectory for the autonomous vehicle based at least in part on the detection and the one or more predicted future velocities.

In some implementations, (a) includes fusing sensor data from two or more distinct sensor modalities into a common representation; and (b) is based at least in part on the common representation of the sensor data.

In some implementations, (b) further includes processing the sensor data with the machine-learned perception model to generate one or more uncertainty scores respectively associated with the one or more predicted future velocities.

In some implementations, the method further includes, prior to (c), processing the one or more predicted future velocities and the one or more uncertainty scores with a machine-learned object tracker model configured to generate one or more second velocity outputs including data descriptive of a velocity of the actor; and the motion trajectory for the autonomous vehicle is based at least in part on the one or more second velocity outputs.

In some implementations, the machine-learned object tracker model is configured to smooth the one or more predicted future velocities to generate the one or more second velocity outputs, and the one or more second velocity outputs include smoothed velocity outputs.

In some implementations, the machine-learned object tracker model includes a multi-view tracker model and the machine-learned perception model includes a multi-view perception model.

In some implementations, the machine-learned perception model is simultaneously trained to generate the detection of the actor and the one or more predicted future velocities.

In some implementations, the one or more predicted future velocities are respectively associated with one or more discrete future time steps.

In some implementations, the one or more predicted future velocities are determined in increments up to a prediction end time occurring at a given amount of time after a current time associated with the sensor data.

In some implementations, (b) includes: determining bounding box data associated with the actor in the sensor data based on the machine-learned perception model, and the machine-learned perception model is configured to regress instantaneous velocities of the one or more objects; and regressing the one or more predicted future velocities by the machine-learned perception model.

In some implementations, the sensor data includes a plurality of sweeps of the environment of the autonomous vehicle.

In some implementations, the sensor data includes sweep metadata indicative of a relative sweep of the plurality of sweeps in which the sensor data is captured.

In some implementations, the machine-learned perception model is trained on training data including training sensor data labeled with actual state characteristics of one or more actors depicted in the training sensor data.

In another aspect, an autonomous vehicle control system includes: one or more processors; and one or more non-transitory computer-readable media storing executable instructions that cause the one or more processors to perform operations including: (a) obtaining sensor data descriptive of (i) an actor in an environment of an autonomous vehicle and (ii) at least a portion of the environment of the autonomous vehicle that does not include the actor, the sensor data including at least one sweep of the environment of the autonomous vehicle; (b) processing the sensor data with a machine-learned perception model to generate a detection of the actor and one or more predicted future velocities; and (c) determining a motion trajectory for the autonomous vehicle based at least in part on the detection and the one or more predicted future velocities.

In some implementations, (a) includes fusing sensor data from two or more distinct sensor modalities into a common representation; and (b) is based at least in part on the common representation of the sensor data.

In some implementations, (b) further includes processing the sensor data with the machine-learned perception model to generate one or more uncertainty scores respectively associated with the one or more predicted future velocities.

In some implementations, the instructions further include, prior to (c), processing the one or more predicted future velocities and the one or more uncertainty scores with a machine-learned object tracker model configured to generate one or more second velocity outputs including data descriptive of a velocity of the actor; and the motion trajectory for the autonomous vehicle is based at least in part on the one or more second velocity outputs.

In another aspect, an autonomous vehicle includes: one or more processors; and one or more non-transitory computer-readable media storing executable instructions that cause the one or more processors to perform operations including: (a) obtaining sensor data descriptive of (i) an actor in an environment of an autonomous vehicle and (ii) at least a portion of the environment of the autonomous vehicle that does not include the actor, the sensor data including at least one sweep of the environment of the autonomous vehicle; (b) processing the sensor data with a machine-learned perception model to generate a detection of the actor and one or more predicted future velocities; and (c) determining a motion trajectory for the autonomous vehicle based at least in part on the detection and the one or more predicted future velocities.

In some implementations, (b) further includes processing the sensor data with the machine-learned perception model to generate one or more uncertainty scores respectively associated with the one or more predicted future velocities.

In some implementations, the instructions further include, prior to (c), processing the one or more predicted future velocities and the one or more uncertainty scores with a machine-learned object tracker model configured to generate one or more second velocity outputs including data descriptive of a velocity of the actor; and the motion trajectory for the autonomous vehicle is based at least in part on the one or more second velocity outputs.

DETAILED DESCRIPTION

Figure 1:
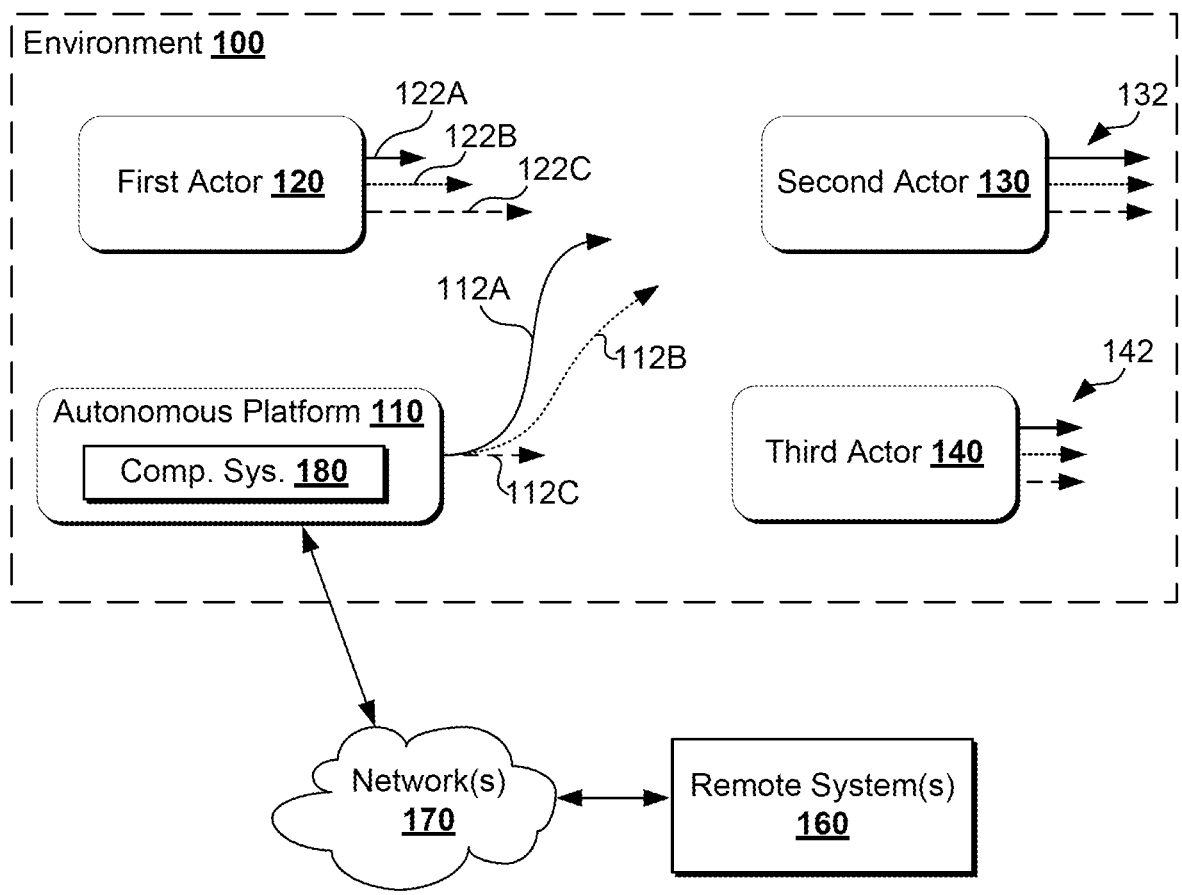
FIG. 1 is a block diagram of an example operational scenario according to some implementations of the present disclosure.

The following describes the technology of this disclosure within the context of an autonomous vehicle for example purposes only. As described herein, the technology described herein is not limited to an autonomous vehicle and can be implemented for or within other autonomous platforms and other computing systems.

Generally, example aspects of the present disclosure are directed to improved perception systems for autonomous platforms, such as for autonomous robots, autonomous vehicles and/or semi-autonomous vehicles. A perception system is one functional component of an autonomy computing system, which is designed to provide a comprehensive understanding of a surrounding environment. The perception system can integrate map data and sensor data from one or more sensors (e.g., cameras, LIDAR systems, RADAR systems, etc.) into fused representations depicted in one or more views (e.g., Euclidean view, range view, etc.) Specific operations can be performed relative to the fused representations, including detection of actors and other objects within the surrounding environment, recurrent tracking of detected actors/objects, and determination of environmental context for use by other components of the autonomy computing system (e.g., forecasting and/or motion planning systems).

According to example aspects of the present disclosure, a perception system is improved by including functionality for predicting future actor velocities. More particularly, multiple sweeps of sensor data (e.g., LIDAR data) can be captured and processed by the perception system to produce object data including data descriptive of one or more predicted future velocities of the objects in the environment of the vehicle. For instance, the predicted future velocity(s) can be predicted at one or more discrete future time steps. In some implementations, the discrete future time steps can be in fixed or varied increments (e.g., 0.1 s, 0.5 s, 1.0 s) from a current time up to a prediction end time occurring at a given amount of time in the future (e.g., 200 ms, 500 ms, 1 ms, 2 ms, 3 ms, 5 ms after the current time). The predicted future velocity(s) can have an associated uncertainty score indicative of a confidence of the predicted future velocity. The uncertainty score can be associated with the prediction over some or all time steps and/or with a particular time step. The predicted future velocities and the uncertainty scores can be passed to an object tracker model that predicts one or more smoothed velocity outputs associated with the objects in the environment of the vehicle. The smoothed velocity outputs can then be passed to a motion planning stage that determines a motion plan for the autonomous vehicle based at least in part on the smoothed velocity output(s). The motion plan can be executed by control systems onboard the vehicle to control various systems of the vehicle.

Learned velocity prediction models as described herein can advantageously provide for use of the context available in raw sensor data. This context can be beneficial relative to models, such as object tracking models, which can sometimes rely only on state data and thus don't have raw sensor data available at subsequent processing stages. Training the object tracker models and perception models jointly can also provide an improved understanding of the environment context, which can lead to improved accuracy in object detection in addition to improved accuracy of future velocity predictions. The raw sensor data available to the velocity prediction models described herein can provide richer context than state data alone. For instance, environments as a whole can provide more information about the behavior of objects (e.g., vehicles) than state data about the objects alone, even in the aggregate for multiple objects in an environment. As one example, if a first vehicle is leading a second vehicle and the first vehicle begins to decelerate, that can serve as a strong indication that the second vehicle will decelerate in the future, even if there is no indication from the behavior of the second vehicle at the time that the second vehicle is decelerating. Similarly, a standstill vehicle with other vehicles in front of the standstill vehicle accelerating can serve as a strong indication that the standstill vehicle will soon accelerate. This context of the environment allows for predicting future velocities that, even if not as refined as downstream future velocities, can more accurately represent future movements that are understandable only from the larger context.

Advantageously, the systems and methods described herein provide a number of technical effects and benefits. As one example, the learned velocity prediction models described herein can more accurately predict future velocities of objects (e.g., compared to traditional physics-based models). The learned models described herein can operate directly on raw sensor data, providing richer context than the state data alone, which traditional physics-based models rely on.

With reference to FIGS. 1-7, example embodiments of the present disclosure are discussed in further detail. FIG. 1 is a block diagram of an example operational scenario according to example implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

In some implementations, the environment 100 can include an indoor environment (e.g., within one or more facilities, etc.) or an outdoor environment. An indoor environment, for example, can include environments enclosed by a structure such as a building (e.g., a service depot, maintenance location, manufacturing facility, etc.). An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

In some implementations, the autonomous platform 110 can include any type of platform configured to operate within the environment 100. For example, the autonomous platform 110 can include one or more different type(s) of vehicle(s) configured to autonomously perceive and operate within the environment 100. The vehicles, for example, can include one or more ground-based autonomous vehicle(s) such as, for example, one or more autonomous cars, trucks, vans, etc. The autonomous platform 110 can include an autonomous vehicle that can control, be connected to, or otherwise associated with implements, attachments, and/or accessories for transporting people or cargo. This can include, for example, an autonomous tractor optionally coupled to a cargo trailer. In addition, or alternatively, the autonomous platform 110 can include any other type of vehicle such as one or more aerial vehicles, water-based vehicles, space-based vehicles, other ground-based vehicles, etc.

In some implementations, the autonomous platform 110 can communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicative of tasks for the autonomous platform 110 to perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, the environment 100 can include one or more objects. This can include object(s) not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc. In some implementations, the first actor 120, the second actor 130, and/or the third actor 140 can only have one associated trajectory. In some implementations, uncertainty scores (e.g., uncertainty and/or confidence score(s)) can be associated with the first actor trajectories 122A-C, second actor trajectories 132, third actor trajectories 142, etc.

As further described herein, the autonomous platform 110 can utilize its autonomy system(s) to detect these actors (and their movement) and plan its motion to navigate through the environment 100 according to one or more platform trajectories 112A-C. For example, the autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
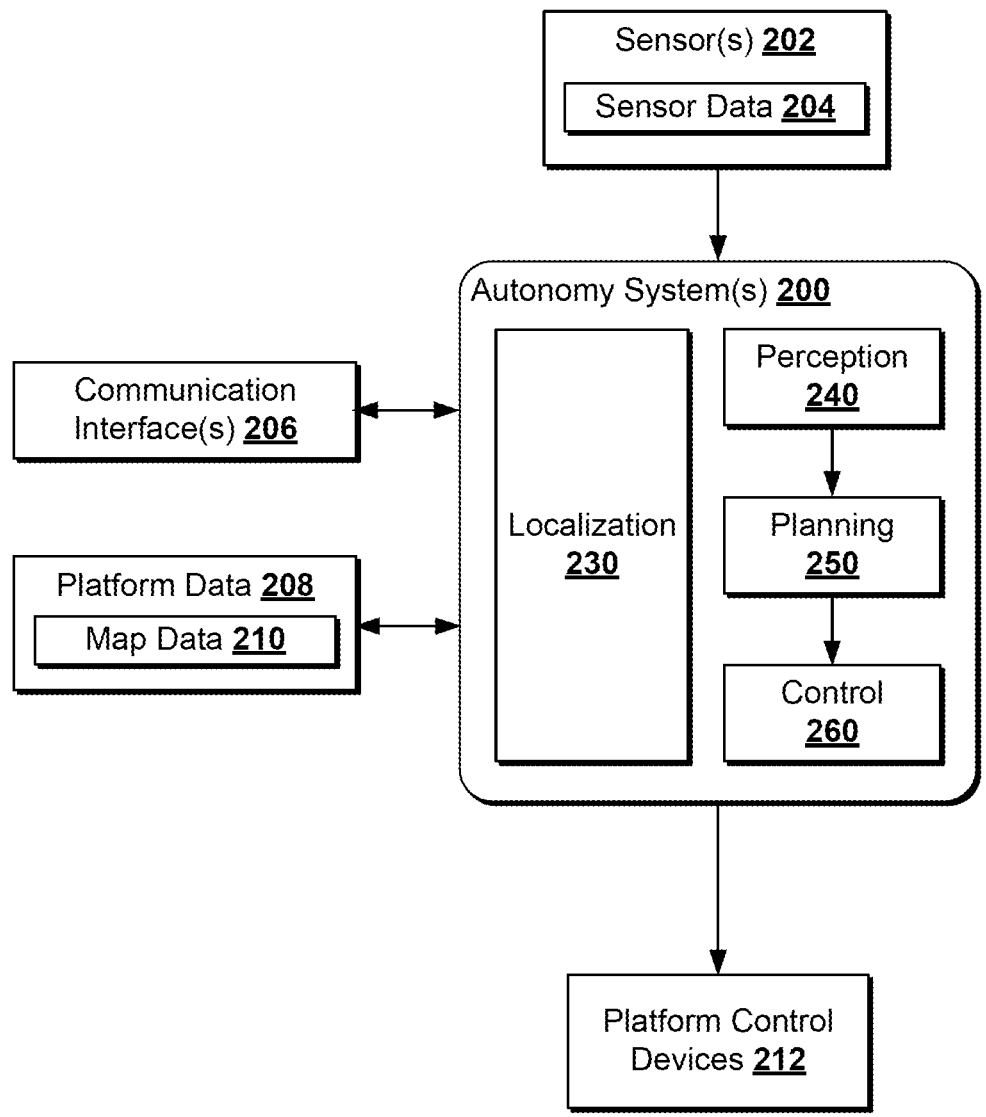
FIG. 2 is a block diagram of an example autonomy system for an autonomous platform according to some implementations of the present disclosure.

FIG. 2 is a block diagram of example autonomy system(s) 200 for an autonomous platform according to example implementations of the present disclosure. In some implementations, the autonomy system(s) 200 can be implemented by a computing system of an autonomous platform (e.g., the onboard computing system(s) 180 of the autonomous platform 110). For instance, the autonomy system(s) 200 can operate to obtain inputs from sensor(s) 202 or other input devices. In some implementations, the autonomy system(s) 200 can obtain (e.g., access, store, etc.) platform data 208 (e.g., map data 210). The autonomy system(s) 200 can generate control outputs for controlling the autonomous platform (e.g., through platform control devices 212, etc.) based on sensor data 204, map data 210, or other data. The autonomy system(s) 200 can include different subsystems for performing various autonomy operations. For example, autonomy operation subsystems can include a localization system 230, a perception system 240, a planning system 250, and a control system 260. For instance, the localization system 230 can provide an autonomous platform with an understanding of its position in an environment; the perception system 240 can provide for an autonomous platform's detection, understanding, and tracking of its environment (e.g., environmental features, objects in an environment, etc.); the planning system 250 can provide for determining how the autonomous platform is to interact with and in its environment; and the control system 260 can provide for an interface between the autonomy system(s) 200 and the platform control devices 212 for controlling the autonomous platform. The autonomy system(s) 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system(s) 200 can be shared among its subsystems, or a subsystem can have a set of dedicated computing resources.

In some implementations, the autonomy system(s) 200 can be implemented for or by an autonomous vehicle (e.g., a ground-based autonomous vehicle). For example, the autonomy system(s) 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system(s) 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

The autonomy system(s) 200 can be located onboard (e.g., on or within) an autonomous platform and can be configured to operate the autonomous platform in various environments. In some implementations, this can be a real-world environment. In some implementations, the autonomy system(s) 200 or its functionality can be utilized for a simulation. This can include, for example, simulating the operation of a simulated autonomous platform within a simulated environment or operational scenario. In some implementations, one or more simulation computing devices can simulate one or more of: the sensors 202, the sensor data 204, communication interface(s) 206, the platform data 208, or the platform control devices 212 for simulating operation of the autonomy system(s) 200.

In some implementations, the autonomy system(s) 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system(s) 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system(s) 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). In addition, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicative of or otherwise associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system(s) 200 can obtain input from additional types of sensors, such as inertial measurement units, altimeters, inclinometers, odometry devices, location or positioning devices (e.g., GPS, compass), or other types of sensors. In some implementations, the autonomy system(s) 200 can obtain sensor data 204 associated with particular component(s) or system(s) of an autonomous platform. This sensor data 204 can be indicative of, for example, wheel speed, component temperatures, steering angle, cargo or passenger status, etc. In some implementations, the autonomy system(s) 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can be indicative of static object(s) or actor(s) within an environment of the autonomous platform. The multi-modal sensor data can include at least two types of sensor data fused together (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform. Some example aspects of the present disclosure make reference to sweeps of sensor data. A sweep of sensor data can refer to, for example, a set of related sensor data 204. A single sweep of sensor data 204 can be or include a single image, a single pass of a sensor 202 throughout a portion of the environment, a single measurement, etc. and/or can include some or all sensor data captured at a given point of time, at a given measurement query, or any other suitable form of sweeping sensor data.

The autonomy system(s) 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicative of an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.).

The autonomy system(s) 200 can include the localization system 230, which can provide an autonomous platform with an understanding of its position in an environment. In some examples, the localization system 230 can support one or more other subsystems of the autonomy system(s) 200, such as by providing a unified local reference frame for performing, e.g., perception operations, planning operations, or control operations.

In some implementations, the localization system 230 can determine a current position of an autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system(s) 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system(s) 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system(s) 200 can include the perception system 240, which can allow an autonomous platform to detect, understand, and track its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

For instance, the perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainty scores associated therewith; or other state information. In some implementations, the perception system 240 can determine the state(s) using one or more algorithms or machine-learned models configured to identify/classify objects based on inputs from the sensor(s) 202. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

According to example aspects of the present disclosure, in addition to and/or alternatively to predicting the one or more states associated with the one or more objects, the perception system 240 can predict one or more predicted future velocities associated with the one or more objects in the surrounding environment. The predicted future velocities can represent predicted future velocity associated with the one or more objects at one or more discrete future time steps. In some implementations, the discrete future time steps can be in fixed or varied increments (e.g., 0.1 s, 0.5 s, 1.0 s) from a current time up to a prediction end time occurring at a given amount of time in the future (e.g., 200 ms, 500 ms, 1 ms, 2 ms, 3 ms, 5 ms after the current time). The predicted future velocity(s) can have an associated uncertainty score indicative of a confidence of the predicted future velocity. The uncertainty score can be associated with the prediction over some or all time steps and/or with a particular time step. One example perception system according to example aspects of the present disclosure is discussed in greater detail with reference to FIG. 4.

The current and/or past speed/velocity and/or the one or more predicted future velocities that are predicted by the perception system 240 can include longitudinal (e.g., along-track) velocities, lateral (e.g., cross-track) velocities, and/or other types of angular velocities that are determined relative to one or more specific orientations. Longitudinal, or along-track, velocity can refer to a velocity along (e.g., in a direction of/defined by) a track, such as a velocity along a current heading of an autonomous platform, a predetermined track such as a center of a lane, or other suitable track. Similarly, lateral, or cross-track velocity, can refer to a velocity across (e.g., perpendicular to a direction of/defined by) the track. Either or both of longitudinal velocity and/or lateral velocity can be regressed through perception system 240 to produce predicted future velocities as described herein. The parameters predicted by perception system 240 are also not limited to velocities. For example, prediction system 240 can be configured to determine predicted future acceleration, jerk, or other higher order output parameters. Predicted future acceleration, jerk, and/or other higher order output parameters can also be predicted in terms of a longitudinal, lateral, or other angular parameter.

The autonomy system(s) 200 can include a planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

To help with its motion planning decisions, the planning system 250 can be configured to perform a forecasting function. In some implementations, forecasting can include determining one or more strategies for the autonomous platform to move through its environment. A strategy can include one or more discrete decisions, such as interpretable decisions (e.g., yield to an actor, merge behind an actor, etc.). In some implementations, discrete decision(s) can be amenable to interpretable constraints, such that invalid strategies can be eliminated from consideration under interpretable guidelines.

The planning system 250 can forecast future state(s) of the environment based on one or more strategies for the autonomous platform. This can include forecasting future state(s) of the autonomous platform or other actors in the environment. In some implementations, the planning system 250 can forecast future state(s) based on current or past state(s) (e.g., as developed or maintained by the perception system 240) in addition to and/or in the alternative to the predicted future velocity(s) from the perception system 240. In some implementations, future state(s) can be or include forecasted trajectories (e.g., positions over time) of the autonomous platform or objects in the environment, such as other actors. In some implementations, one or more of the future state(s) can include one or more probabilities associated therewith (e.g., marginal probabilities, conditional probabilities). For example, the one or more probabilities can include one or more probabilities conditioned on strategy or trajectory options available to the autonomous platform. Additionally, or alternatively, the probabilities can include probabilities conditioned on trajectory options available to one or more other actors.

In some implementations, the planning system 250 can provide for an interactive approach for generating and controlling movement of the autonomous platform through its environment. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system(s) 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally, or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally, or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

Returning to FIG. 2, in some implementations, the planning system 250 can determine a desired trajectory for executing a desired strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories or strategies for the autonomous platform (e.g., "avoid lane boundaries," "minimize jerk," etc.). In addition, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories or strategies based on one or more static costs, one or more dynamic costs, or a combination thereof. The planning system 250 can select a motion plan (and a corresponding trajectory) based on a ranking of a plurality of candidates. In some implementations, the planning system 250 can select a highest ranked candidate, or a highest ranked feasible candidate.

To implement selected motion plan(s), the autonomy system(s) 200 can include a control system 260 (e.g., a vehicle control system). Generally, the control system 260 can provide an interface between the autonomy system(s) 200 and the platform control devices 212 for implementing the strategies and motion plan(s) generated by the planning system 250. For instance, the control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system(s) 200 (or vice versa) through the communication channel(s).

The autonomy system(s) 200 (and their software) can be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
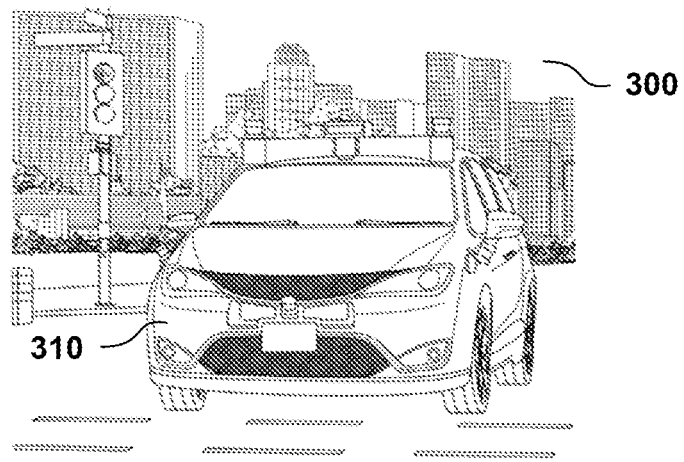
FIGS. 3A-3D are example operational environments for an autonomous platform according to some implementations of the present disclosure.

For example, with reference to FIG. 3A, an operational environment can include a dense environment 300. An autonomous platform can include an autonomous vehicle 310 controlled by the autonomy system(s) 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
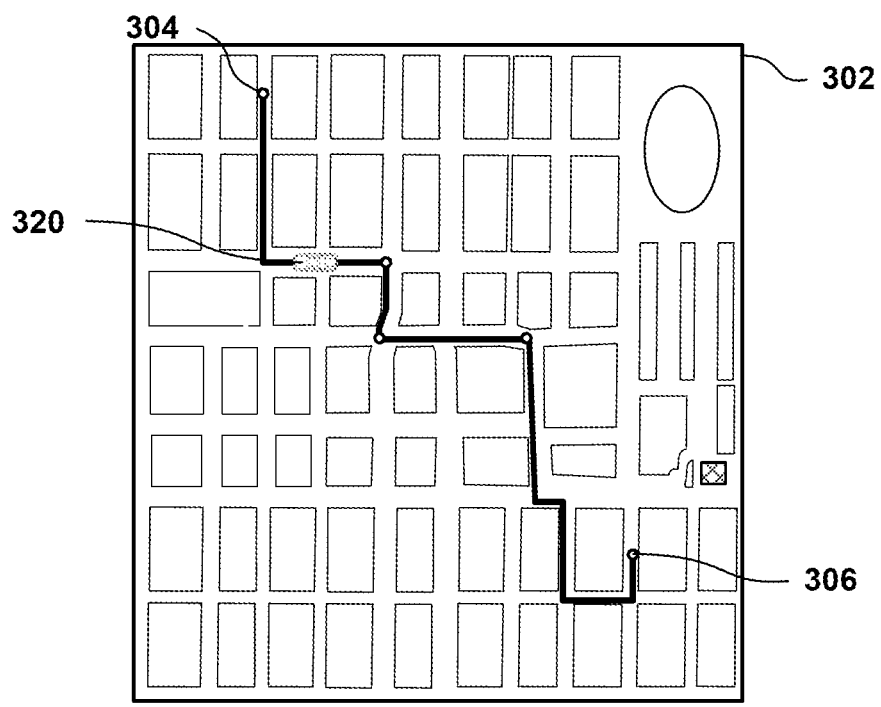

With reference to FIG. 3B, a selected overhead view 305 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
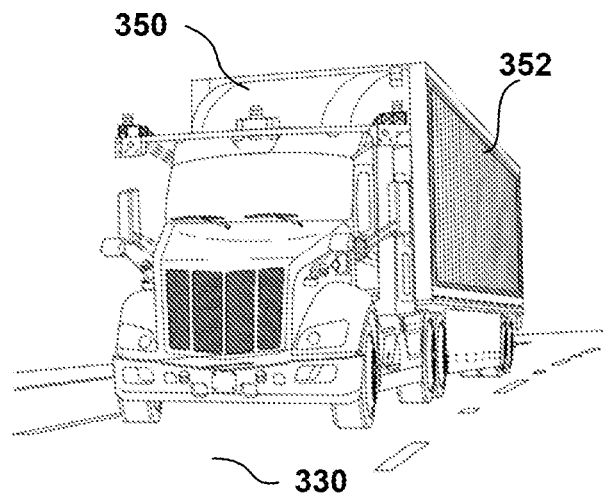

With reference to FIG. 3C, in another example, an operational environment can include an open travel way environment 330. An autonomous platform can include an autonomous vehicle 350 controlled by the autonomy system(s) 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
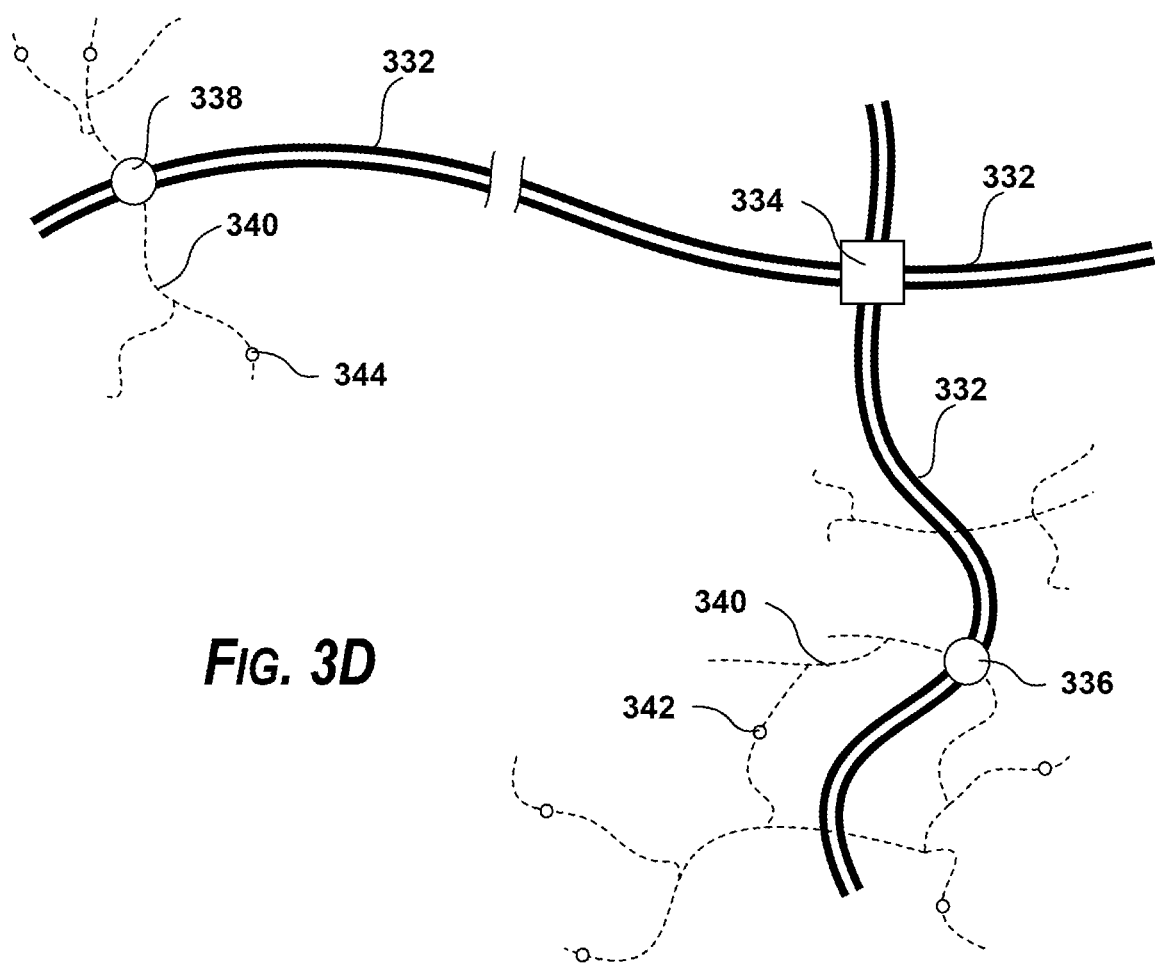

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to the transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338, and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To help improve the performance of an autonomous platform, such as an autonomous vehicle controlled at least in part using autonomy system(s) 200 (e.g., the autonomous vehicles 310 or 350), systems and methods according to example aspects of the present disclosure can utilize perception systems including functionality for predicting future actor velocities. More particularly, multiple sweeps of sensor data (e.g., LIDAR data) can be captured and processed by the perception system to produce object data including data descriptive of one or more predicted future velocities of the objects in the environment of the vehicle. For instance, the predicted future velocity(s) can be predicted at one or more discrete future time steps. In some implementations, the discrete future time steps can be in fixed or varied increments (e.g., 0.1 s, 0.5 s, 1.0 s) from a current time up to a prediction end time occurring at a given amount of time in the future (e.g., 200 ms, 500 ms, 1 ms, 2 ms, 3 ms, 5 ms after the current time). The predicted future velocity(s) can have an associated uncertainty score indicative of a confidence of the predicted future velocity. The uncertainty score can be associated with the prediction over some or all time steps and/or with a particular time step. The predicted future velocities and the uncertainty scores can be passed to an object tracker model that predicts one or more smoothed velocity outputs associated with the objects in the environment of the vehicle. The smoothed velocity outputs can then be passed to a motion planning stage that determines a motion plan for the autonomous vehicle based at least in part on the smoothed velocity output(s). The motion plan can be executed by control systems onboard the vehicle to control various systems of the vehicle.

Figure 4:
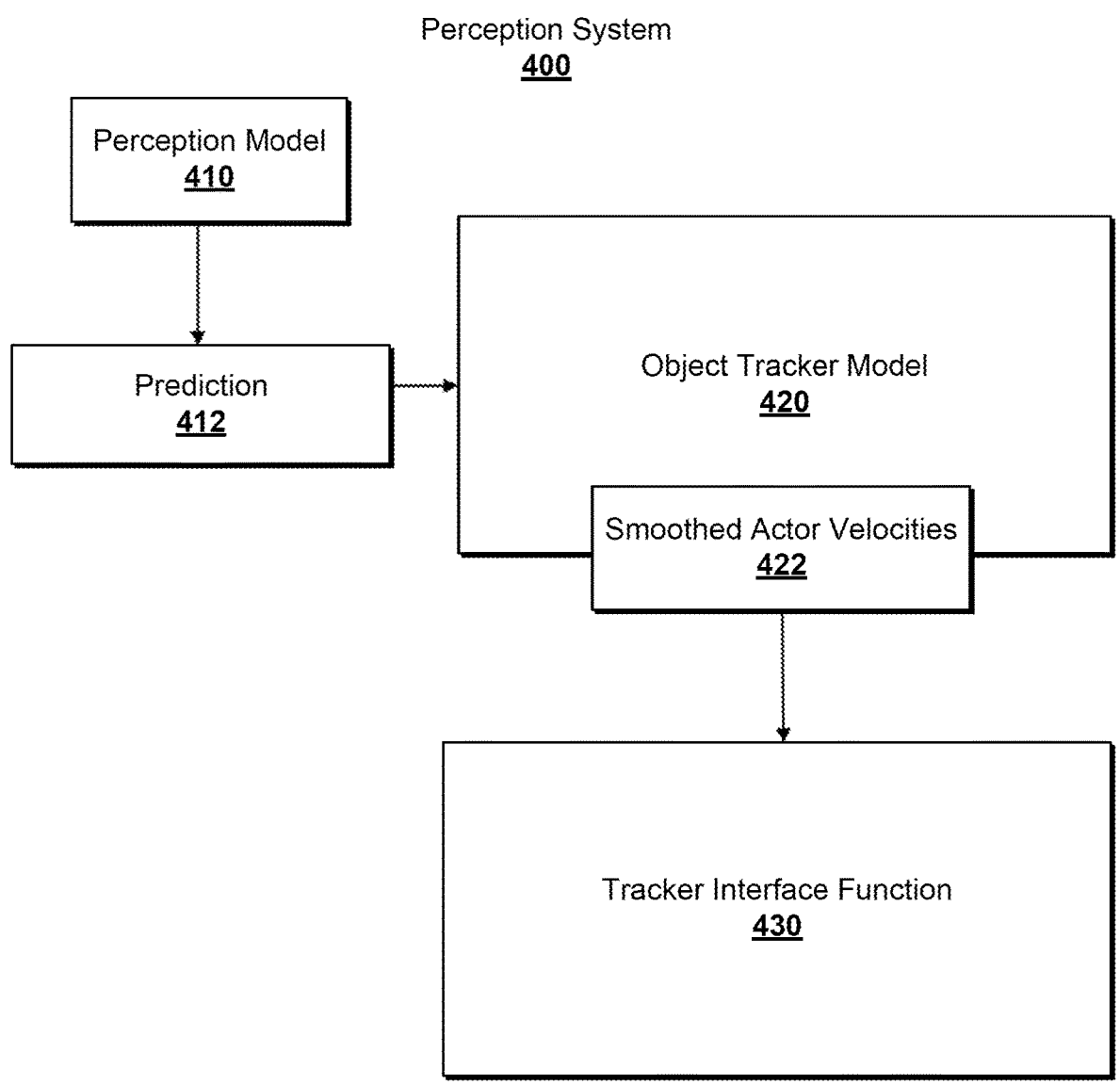
FIG. 4 is a block diagram of an example perception system according to some implementations of the present disclosure.

FIG. 4 is a block diagram of an example perception system 400 according to some implementations of the present disclosure. The perception system 400 can be a portion of an autonomy system, such as perception system 240 of autonomy system 200 of FIG. 2.

The perception system 400 can include a perception model 410. The perception model 410 can process sensor data (e.g., sensor data 204 from sensor(s) 202 located onboard an autonomous platform and/or autonomous vehicle) to make predictions 412 about objects in the environment. The predictions 412 can include data descriptive of predicted position, extent (e.g., length, width, height), heading, motion (e.g., instantaneous velocity, acceleration), and/or category (e.g., vehicle, pedestrian, bicyclist, motorcyclist, stationary object, etc.) of the objects in the environment. Additionally and/or alternatively, the predictions 412 can include uncertainties associated with the predicted position, extent, heading, motion, etc. The predictions 412 can be associated with a given time step (e.g., a current time step and/or past time step). According to implementations of the present disclosure, the predictions 412 may also include predicted future velocities of the objects in the environment.

In some implementations, the perception model 410 can process one or more sweeps of sensor data to provide (e.g., regress) one or more predicted future velocities. For instance, in some implementations, the sensor data includes a plurality of sweeps of the environment of the autonomous vehicle. In some implementations, the sensor data includes sweep metadata (e.g., timestamps, relative sweep identifier, etc.) indicative of a relative sweep of the plurality of sweeps in which the sensor data is captured.

The perception model 410 can predict the one or more future velocities directly from the sensor data, including sensor data describing the object and sensor data describing the remainder of the scene (e.g., other objects in the environment and/or the environment itself). The perception model 410 can consider sensor data providing context about the surrounding environment that downstream components (e.g., object tracker model 420) can have limited access to. For instance, consider a motivating example of a vehicle approaching stopped traffic. Sensor data captured over multiple sweeps provides context on attributes such as deceleration for other vehicles as they approach the stopped traffic. Tracking methods based only on instantaneous data would instead require that each actor (e.g., vehicle) be observed decelerating, which can take a greater amount of time to observe and/or plan for.

More particularly, in some implementations, a computing system associated with an autonomous platform (e.g., an autonomous vehicle) can receive sensor data from one or more sensors on the autonomous platform. For instance, the perception model 410 can obtain sensor data descriptive of an environment of an autonomous vehicle (e.g., a portion of the environment). The sensor data can be descriptive of one or more actors in the environment of the autonomous vehicle and/or at least a portion of the environment of the autonomous vehicle that does not include the actor(s). The sensor data can include at least one sweep of the environment of the autonomous vehicle. In some implementations, the sensor data can include image data obtained from one or more cameras. In some implementations, the sensor data can include LIDAR data obtained from a LIDAR system. Furthermore, in some implementations, the sensor data can include RADAR data obtained from a RADAR system. In some implementations, the sensor data can include a bird's eye view representation of data (e.g., LIDAR data) obtained relative to the autonomous vehicle. In some implementations, the computing system can project the LIDAR point cloud data obtained from the LIDAR system to a bird's eye view representation of the LIDAR point cloud data. In some implementations, the machine-learned perception model can be or can include a multi-view perception model. For instance, the perception model can process data in multiple views (e.g., simultaneously and/or concurrently), such as from both a birds-eye view and/or a range view.

In some implementations, the perception model 410 can fuse sensor data from two or more distinct sensor modalities into a common representation, where the predicted future velocities are based at least in part on the common representation of the sensor data. In some implementations, the perception model 410 and/or prior components can perform multi-sensor fusion to fuse multiple types and/or sweeps of sensor data into a fused (e.g., oriented) representation of the sensor data. For instance, in some example implementations, the perception model 410 can process camera data projected onto a LIDAR point cloud. The perception model 410 can be a deep learning detection module that uses sensor fusion to learn and infer from multiple sensor modalities, creating a deep understanding of the world around the autonomous platform. Multi-sensor fusion can preserve the complementary strengths of different sensor modalities and progressively fuse them (e.g., in addition to and/or alternatively to map information) into a common view to produce high-quality detections of actors such as pedestrians, vehicles, and cyclists in three dimensions and at long ranges.

Sensor data fusion can be complex in that different sensors have different resolutions and views of the world. The perception model 410 can progressively extract and store information from the different sensor views of the environment of the autonomous platform to fuse the sensor data into a common three-dimensional representation. For instance, in some implementations, LIDAR data can be projected into a three-dimensional Euclidean view and/or a wrap-around range view. Projecting LIDAR data into multiple views can increase the understanding provided by the sensor data. The Euclidean view can provide precise three-dimensional position and velocity information. The range-view can support the azimuthal resolution and long-range capabilities of the sensor. RADAR can be projected into a Euclidean view while extracting Doppler velocity information. Image data can be combined from some or all of the cameras on an autonomous platform (e.g., an autonomous vehicle).

In some implementations, a computing system associated with an autonomous vehicle can include a fusion system (e.g., a map fusion system) that is configured to modify sensor data from a sensor system (e.g., LIDAR point cloud data representing a three-dimensional view of the environment) based on geographic prior data from a map system, resulting in map-modified sensor data (e.g., map-modified LIDAR data). For example, a fusion system can include a machine-learned neural network configured to implement continuous convolutions for multi-sensor fusion. In some implementations, the machine-learned neural network can include one or more fusion layers that are configured to fuse image features from image data (e.g., image data captured by a camera system within an autonomous vehicle) with LIDAR features from LIDAR point cloud data (e.g., LIDAR point cloud data captured by a LIDAR system within an autonomous vehicle). In some implementations, points in the sensor data can be tagged with a time stamp, relative sweep instance, or other unique identifier to temporally relate the sensor data points.

In some implementations, existing map data can be used to enrich the output of the perception system(s). For instance, map data can be rasterized into a similar Euclidean view that matches the other Euclidean view grids. More particularly, in some implementations, a computing system associated with an autonomous platform can access or otherwise obtain map data indicative of the surrounding geographic environment of an autonomous platform. For example, map data can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the map data can be provided in a bird's eye view representation. In some implementations, such a bird's eye view representation of the map data can be generated by rasterization or other suitable processing format.

The result from the raw data inputs can provide complementary sensor data in views such as a Euclidean view, a range view, and/or a camera image. The views depict valuable and/or unique information that will ultimately contribute to a holistic representation of the surroundings of the autonomous platform. The data is then processed by the perception model 410 to extract the valuable information from each view. The perception model 410 provides an enriched view of the world around the autonomous platform by processing the data with one or more machine-learned models. In some implementations, Euclidean tensor views from sensor data such as LIDAR, RADAR, and/or map data are stacked into a tensor that is processed by the perception model 410 to produce intermediate Euclidean tensor view features. Additionally and/or alternatively, range view inputs are processed by the perception model 410 (e.g., by a range view model) to produce intermediate range view features. Image data inputs can be fused with the range view features (e.g., by an image fusion engine) to produce a range view enriched by the sensor data, such as by both image and LIDAR inputs.

Detections can be produced in the Euclidean view to provide rich and detailed three-dimensional information. One example implementation employs a Euclidean ray scatter engine that transfers points from the range view data into the Euclidean space. Each pixel in the range view precisely corresponds to a point in three dimensions. Features corresponding to the pixel in the range view are traced back to their location in three dimensions and then placed in the appropriate cell in the Euclidean view. This process is repeated for each pixel in the range view for a given time step, generating a corresponding Euclidean tensor view from range data. The information captured in range view is thus migrated into the Euclidean view tensors that can now be fused with other Euclidean future maps originating from the other sensor modalities.

At this point, feature maps from different sensor modalities are in the Euclidean tensor view. The feature maps can be stacked together and processed by the perception model 410 to produce high quality three-dimensional detections. The detections include properties of the object such as velocity, width, height, length, category, and uncertainty scores on position for each detection. This provides a representation of the environment surrounding the autonomous platform that is rich in data derived from various sensor inputs that is useful for detecting actors on the road and reasoning about the actors. According to example aspects of the present disclosure, the perception model 410 can process sensor data associated with all or a substantial portion of the environment of the autonomous vehicle such that the perception model 410 is able to understand the context associated with a large portion of the environment of the autonomous vehicle (e.g., as compared to cropped sensor data).

In some implementations, the perception model 410 can be or can include a multi-head perception model configured with a plurality of output heads. The output head(s) can output predictions of various actor motion characteristics, such as, for example, instantaneous and/or future velocity, acceleration, heading, bounding box information, classifications, angular velocities, and/or any other suitable degrees of freedom available in the sensor data.

Figure 5:
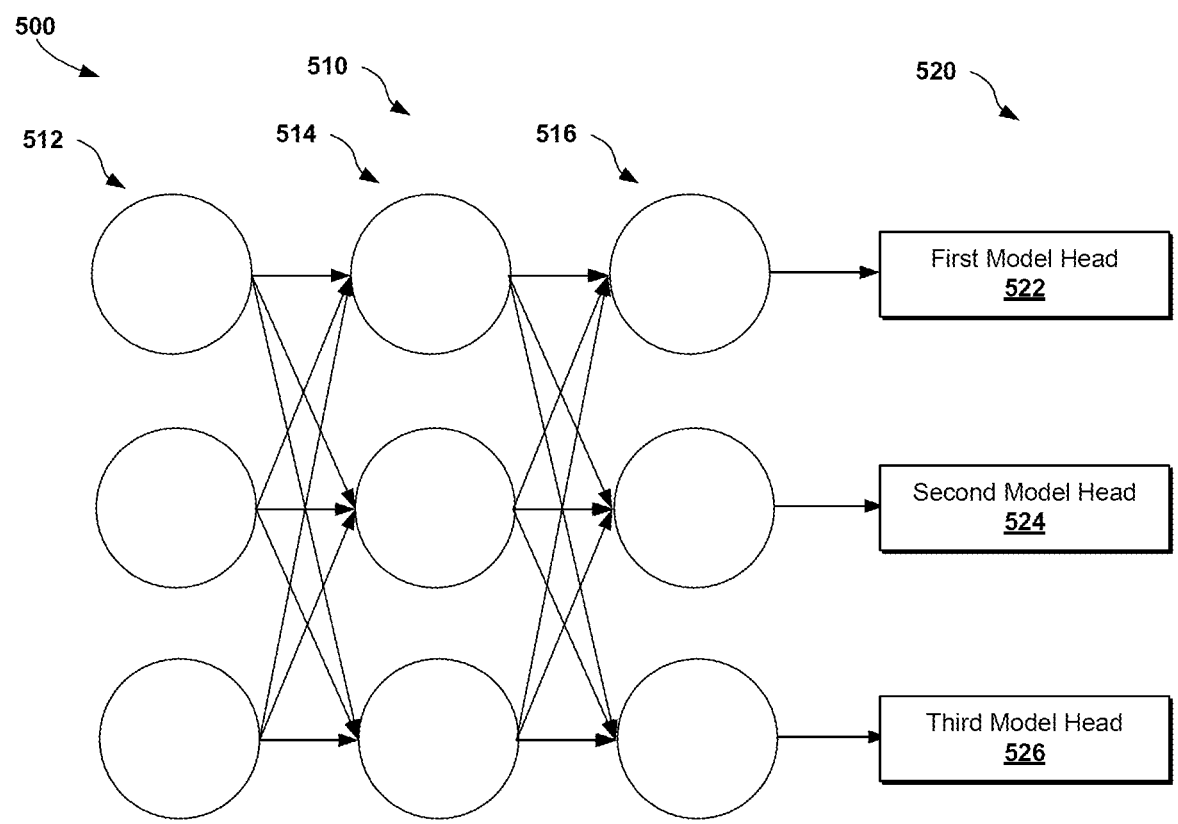
FIG. 5 is a block diagram of an example multi-head perception model according to some implementations of the present disclosure.

One example multi-head perception model 500 is illustrated in FIG. 5. The multi-head perception model 500 can include a backbone network 510 and a plurality of model heads 520. The backbone network 510 can include a plurality of layers, such as layers 512, 514, 516. Each of the plurality of layers 512, 514, 516 can include a plurality of nodes. The backbone network 510 can be any suitable network, such as a neural network (e.g., a convolutional neural network), or other suitable network. Although a 3×3 backbone network 510 is illustrated in FIG. 5 for the purposes of simplicity, it should be understood that any suitable size and/or configuration of backbone network 510 can be used in accordance with the present disclosure. For instance, networks having tens or even hundreds of layers and/or nodes can be employed as backbone network 510 for multi-head perception model 500. Additionally and/or alternatively, a first layer of backbone network 510 can have more, fewer, or a same number of nodes as a second layer of backbone network 510. Additional and/or alternative types of connections (e.g., skip connections) can be implemented between nodes and/or layers in backbone network 510. The backbone network 510 can process sensor data to perform data manipulation functions such as, for example, sensor data projection and/or sensor data fusion as described above.

The multi-head perception model 500 can additionally include a plurality of model heads 520, such as first model head 522, second model head 524, and third model head 526. Each of the model heads 520 can output predictions of various actor motion characteristics, such as, for example, instantaneous and/or future velocity, acceleration, heading, bounding box information, classifications, angular velocities, and/or any other suitable degrees of freedom available in the output from the backbone network 510 (e.g., output from a final or embedding layer, such as layer 516, of the backbone network 510). Each of the model heads 520 can output a distinct actor motion characteristic. For instance, in some implementations, a first model head 522 can be configured to output current velocity and/or acceleration while a second model head 524 can be configured to output future velocity and/or acceleration. A third model head 526 can further output uncertainties associated with the future velocity and/or acceleration. Still further model heads, not illustrated, can output other characteristics and their corresponding uncertainties such as classifications, headings, etc.

Referring again to FIG. 4, in some cases, the perception model 410 can learn certain motion components based at least in part on a number of sweeps of sensor data available to the perception model 410. For instance, the perception model 410 can be capable of predicting position, heading, etc. based on a single sweep of sensor data. The perception model 410 can be capable of predicting velocity, heading, acceleration, jerk, trajectory, etc. with improved accuracy over multiple sweeps of sensor data.

The perception model 410 and/or object tracker model 420 as described herein can be a machine-learned perception model and/or a machine-learned object tracker model that can respectively correspond to or can include one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

The perception model 410 can process the sensor data to generate detection(s) of actor(s) in the environment of the autonomous vehicle. For instance, the detection(s) can include information about the actor(s), such as current pose, current velocity, classifications, bounding box information, etc. at a current time step and/or past time steps (e.g., as a past trajectory). In addition to detecting actors, the perception model 410 can process the sensor data to generate one or more predicted future velocities associated with one or more objects in the environment of the autonomous vehicle and/or one or more uncertainty scores respectively associated with the one or more predicted future velocities based at least in part on the sensor data and the perception model 410 configured to predict the one or more predicted future velocities. For instance, the perception model 410 can output a prediction 412 including predicted future velocities and/or uncertainty scores associated with predicted future velocities.

In some implementations, the one or more predicted future velocities of prediction 412 are respectively associated with one or more discrete future time steps. For instance, in some implementations, the one or more predicted future velocities are determined in increments up to a prediction end time occurring at a given amount of time after a current time associated with the sensor data. In particular, in some implementations, the perception model 410 can regress predicted future velocities for one or more time slices (e.g., up to a certain future time) with a regression target. In some implementations, characteristics of the one or more states of actors associated with instantaneous characteristics (e.g., instantaneous velocity) can be regressed with a local frame target (e.g., for the actor itself). The predicted future velocities of prediction 412, however, can be regressed with a transformation regression target. In particular, the perception model 410 can regress the predicted future velocities of prediction 412 to learn how the position of a given actor changes over the time slices to better estimate velocity through smoothing and/or other post-model transformations.

Additionally and/or alternatively, in some implementations, determining the predicted future velocities of prediction 412 includes determining a plurality of sensor crops based on the sensor data, wherein the plurality of sensor crops include portions of the sensor data respectively associated with the one or more objects; and processing the plurality of sensor crops by the perception model to generate the one or more predicted future velocities and the one or more uncertainty scores respectively associated with the plurality of sensor crops. For instance, in some implementations, determining the plurality of sensor crops includes obtaining an object track descriptive of a predicted track of an object, the object track including an initial position state and a velocity; and determining the sensor crop based at least in part on a portion of the sensor data associated with a region in proximity to the object track. As one example, each sensor crop can be respectively associated with a lane or track frame. The sensor crop can thus include sensor data points (e.g., LIDAR points) from the track frame in which they were captured (e.g., as an overhead view of the track at distinct timestamps).

In some implementations, determining a motion trajectory for an autonomous platform includes processing the one or more predicted future velocities and the one or more uncertainty scores with a machine-learned object tracker model 420 configured to generate one or more second velocity outputs including data descriptive of a velocity of the objects. The motion trajectory for the autonomous vehicle can be based at least in part on the one or more second velocity outputs. For instance, in some implementations, the prediction 412 can be refined by the object tracker model 420. In addition to velocity observations and position observations provided to the tracker and/or based on instantaneous state characteristics such as velocity, bounding box data, etc. the predicted future velocities and their uncertainty scores can intuitively act as an "acceleration observation" indicative of how the actors will change velocities as a given time.

For instance, in some implementations, the machine-learned object tracker model 420 is configured to smooth the one or more predicted future velocities to generate the one or more second velocity outputs, wherein the one or more second velocity outputs are smoothed velocity outputs. The object tracker model 420 can thus smooth the prediction 412 to determine smoothed actor velocities 422 (e.g., second velocity outputs). The smoothed actor velocities 422 can be smoothed such that positions, velocities, etc. are refined as more generally amenable to behavior of real-life actors than those of prediction 412. For instance, the predicted future velocities, etc. at different time steps of smoothed actor velocities 422 can be aligned with motion models for the classes of actors. In some implementations, the machine-learned object tracker model 420 is or includes a multi-view tracker model. For instance, the object tracker model 420 can operate on multiple views of sensor data, such as a three-dimensional Euclidean view, a range view, etc.

A computing system can determine a motion trajectory for the autonomous platform (e.g., autonomous vehicle) based at least in part on the one or more predicted future velocities and the one or more uncertainty scores using a machine-learned motion planning model. For instance, the object tracker model 420 can be accessed by a query-able tracker interface function 430. The tracker interface function 430 can be queried by downstream components of a planning system (e.g., planning system 250 of FIG. 2) to pass smoothed actor velocities 422 and/or other data related to predicted future trajectories of the actors from the object tracker model 420 to the downstream components.

The downstream components, such as the motion planning model, can utilize the smoothed actor velocities 422 and/or uncertainties to predict a motion plan for navigating the autonomous platform. For instance, the smoothed actor velocities 422 and their respective uncertainties can describe how the autonomous platform expects the actors in the environment to behave over a time interval, and the motion planning model can craft a future trajectory for the autonomous platform to navigate with respect to those actors over the time interval. The uncertainties may be used by the motion planning model to affect the future trajectory in various ways. As one example, the motion planning model prioritizes accounting for future velocities having a lower uncertainty (or higher confidence) over those having a higher uncertainty, such as by associating a higher cost with violating motion constraints of actors with low uncertainty in their future velocities. As another example, the motion planning model may disregard future velocities with an unsuitably high uncertainty (e.g., an uncertainty above a threshold). As yet another example, the motion planning model may output a plurality of future trajectories and may ultimately select one of those future trajectories based on the uncertainties of the future velocities (e.g., by selecting a motion plan that best accounts for actors with low uncertainties).

The perception model 410 and/or other models in the perception system 400 can be trained to predict the future velocities based on training data. The perception model 410 can be trained in a supervised training regime. For instance, the perception model 410 can be trained with training data that includes recorded sensor data labeled with at least future velocities. As an example, the training data can include recorded sensor data at a timestep (t), a subsequent timestep (t+1), a third timestep (t+2), and so on. Additionally, the training data can be labeled with future velocity labels at time (t+x), (t+1+x), (t+2+x), and so on, where x is a prediction horizon for which the perception model 410 is trained to predict the future velocities. If, for example, times t, x, and others are measured in seconds and the perception model 410 is being trained to predict future velocities two seconds into the future, the training data can include sensor data at t(0) labeled with a future velocity at t(2), sensor data at t(1) labeled with future velocity at t(3), and so on.

In some implementations, the object tracker model 420 can be jointly trained with the perception model 410. For instance, the perception model 410 and the object tracker model 420 can be trained in an end-to-end training regime with training data including training sensor data (e.g., multimodal sensor data and/or fused sensor data) labeled with actual state characteristics (e.g., instantaneous and/or future velocities, positions, etc.) of one or more actors depicted in the training sensor data. According to example aspects of the present disclosure, in some implementations, training the perception model 410 and the object tracker model 420 jointly can provide for improved estimates of both current and future velocities as well as object detection capabilities of perception model 410. For instance, training the perception model 410 jointly with the object tracker model 420 can provide for improved reasoning about bounding box locations and distinguishing between non-moving actors (e.g., temporarily stationary actors) and other non-moving objects.

Figure 6:
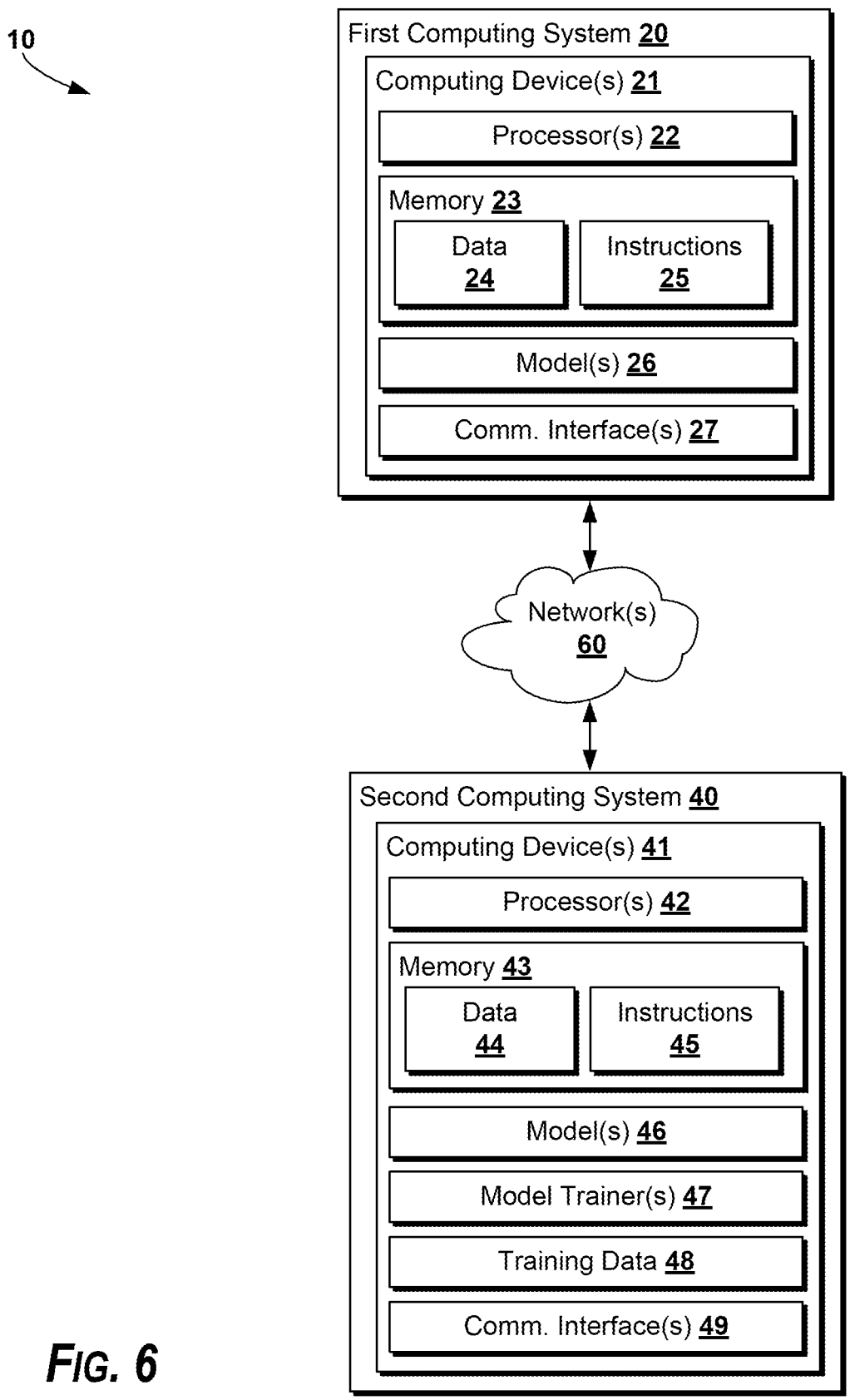
FIG. 6 is a block diagram of an example computing ecosystem according to some implementations of the present disclosure.

FIG. 6 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. The memory 23 can include one or more non-transitory computer-readable storage media, such as RAM, ROM, EEPROM, EPROM, one or more memory devices, flash memory devices, etc., and combinations thereof.

The memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

The memory 23 can store computer-readable instructions 25 that can be executed by the one or more processors 22. The instructions 25 can be software written in any suitable programming language or can be implemented in hardware. Additionally, or alternatively, the instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein.

In some implementations, the first computing system 20 can store or include one or more models 26. In some implementations, the models 26 can be or can otherwise include one or more machine-learned models, such as but not limited to machine-learned perception model 410 and/or machine-learned object tracker model 420. As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in the memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

The memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

The memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, the memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.).

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

In addition, or alternatively to, the model(s) 26 at the first computing system 20, the second computing system 40 can include one or more models 46, such as but not limited to machine-learned perception model 410 and/or machine-learned object tracker model 420. As examples, the model(s) 46 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 6 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. In addition, components illustrated or discussed as being included in one of the computing systems 20 or 40 can instead be included in another one of the computing systems 20 or 40.

Figure 7:
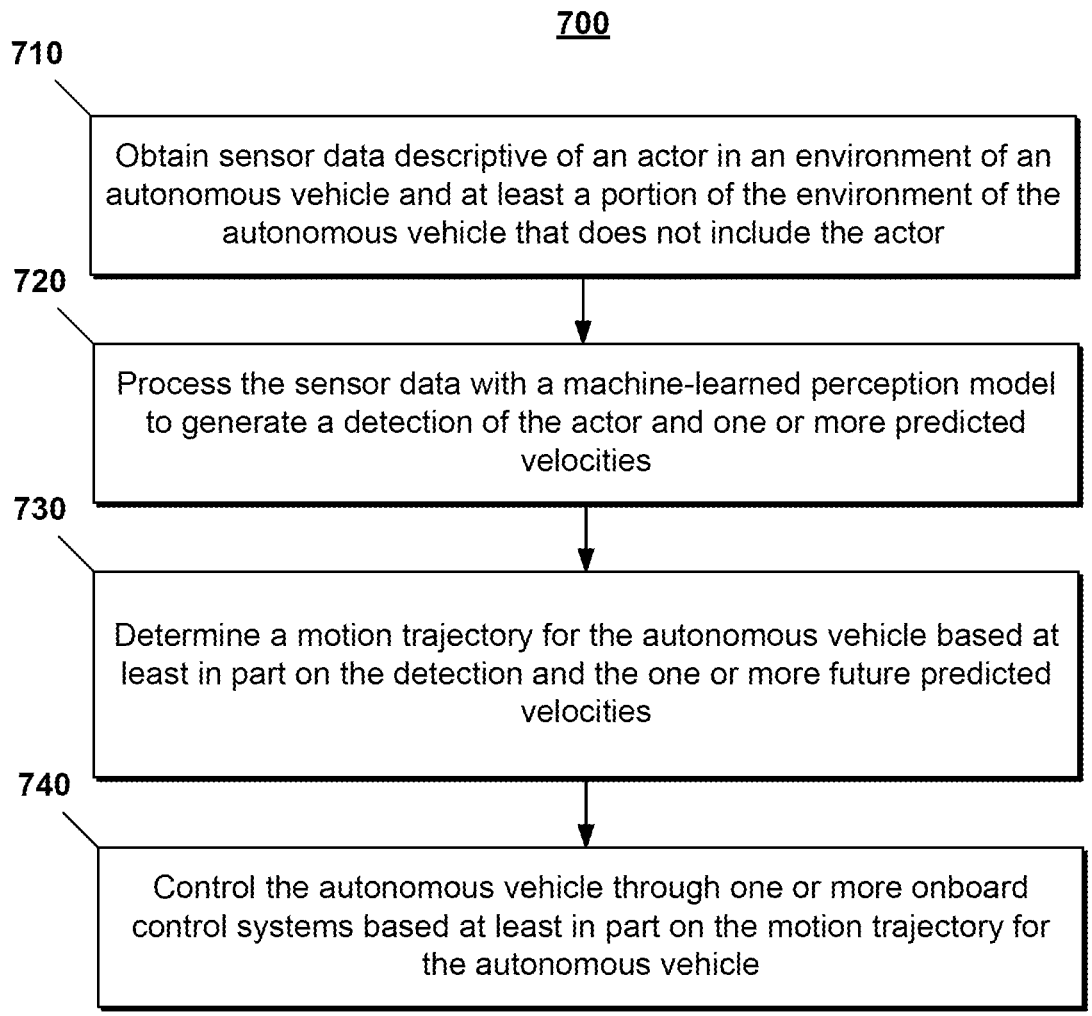
FIG. 7 is a flowchart of a method for generating motion trajectories, according to some implementations of the present disclosure.

FIG. 7 is a flowchart of a method 700 for generating motion trajectories, according to some implementations of the present disclosure. One or more portions of the method 700 can be implemented by one or more devices (e.g., one or more computing devices) or systems including, for example, the computing system 180 shown in FIG. 1, the autonomy system(s) 200 shown in FIG. 2, the computing ecosystem 10 of FIG. 6, and/or any other suitable systems or devices. Moreover, one or more portions of the method 700 can be implemented as an algorithm on the hardware components of the devices described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 700 includes, at 710, obtaining sensor data descriptive of an environment of an autonomous vehicle (e.g., a portion of the environment). The sensor data can be descriptive of one or more actors in the environment of the autonomous vehicle and/or at least a portion of the environment of the autonomous vehicle that does not include the actor(s). The sensor data can include at least one sweep of the environment of the autonomous vehicle. In order to autonomously navigate, the autonomous vehicle (or autonomous platform) can include a plurality of sensors (e.g., a LIDAR system, a RADAR system, cameras, etc.) configured to obtain sensor data associated with the autonomous platform's surrounding environment as well as the position and movement of the autonomous platform. In some implementations, the sensor data can include image data obtained from one or more cameras. In some implementations, the sensor data can include LIDAR data obtained from a LIDAR system. For example, a LIDAR system can be configured to capture LIDAR data (e.g., 3D LIDAR point cloud data associated with an environment surrounding an autonomous platform). In some implementations, the sensor data can include image data obtained from one or more cameras. In some implementations, the sensor data can include a bird's eye view representation of data (e.g., LIDAR data) obtained relative to the autonomous vehicle. In some implementations, the computing system can project the LIDAR point cloud data obtained from the LIDAR system to a bird's eye view representation of the LIDAR point cloud data.

The method 700 includes, at 720, processing the sensor data with a machine-learned perception model to generate a detection of the actor and one or more predicted future velocities. Additionally and/or alternatively, the method can include processing the sensor data with the machine-learned perception model to generate one or more uncertainty scores respectively associated with the one or more predicted future velocities. For instance, the perception model can output a prediction including predicted future velocities and/or uncertainty scores associated with predicted future velocities.

In some implementations, the perception model can be or can include a multi-head perception model configured with a plurality of output heads. The output head(s) can output predictions of various actor motion characteristics, such as, for example, instantaneous and/or future velocity, acceleration, heading, bounding box information, classifications, angular velocities, and/or any other suitable degrees of freedom available in the sensor data.

In some cases, the perception model can be able to learn certain motion components based at least in part on a number of sweeps of sensor data available to the perception model. For instance, the perception model can be capable of predicting position, heading, etc. based on a single sweep of sensor data. The perception model can be capable of predicting velocity, heading, acceleration, jerk, trajectory, etc. with improved accuracy over multiple sweeps of sensor data.

The perception model as described herein can be or can include one or more types of various models, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, (fully) convolutional neural networks, recurrent neural networks (e.g., long short-term memory recurrent neural networks), or other forms of neural networks.

In some implementations, the one or more predicted future velocities are respectively associated with one or more discrete future time steps. For instance, in some implementations, the one or more predicted future velocities are determined in increments up to a prediction end time occurring at a given amount of time after a current time associated with the sensor data. In particular, in some implementations, the perception model can regress predicted future velocities for one or more time slices (e.g., up to a certain future time) with a regression target. In some implementations, characteristics of the one or more states of actors associated with instantaneous characteristics (e.g., instantaneous velocity) can be regressed with a local frame target (e.g., for the actor itself). The predicted future velocities, however, can be regressed with a transformation regression target. In particular, the perception model can regress the predicted future velocities to learn how the position of a given actor changes over the time slices to better estimate velocity through smoothing and/or other post-model transformations.

Additionally and/or alternatively, in some implementations, determining the predicted future velocities includes determining a plurality of sensor crops based on the sensor data, wherein the plurality of sensor crops include portions of the sensor data respectively associated with the one or more objects; and processing the plurality of sensor crops by the perception model to generate the one or more predicted future velocities and the one or more uncertainty scores respectively associated with the plurality of sensor crops. For instance, in some implementations, determining the plurality of sensor crops includes obtaining an object track descriptive of a predicted track of an object, the object track including an initial position state and a velocity; and determining the sensor crop based at least in part on a portion of the sensor data associated with a region in proximity to the object track. As one example, each sensor crop can be respectively associated with a lane or track frame. The sensor crop can thus include sensor data points (e.g., LIDAR points) from the track frame in which they were captured (e.g., as an overhead view of the track at distinct timestamps).

In some implementations, determining a motion trajectory for an autonomous platform includes processing the one or more predicted future velocities and the one or more uncertainty scores with a machine-learned object tracker model configured to generate one or more second velocity outputs including data descriptive of a velocity of the objects. The motion trajectory for the autonomous vehicle can be based at least in part on the one or more second velocity outputs. For instance, in some implementations, the prediction can be refined by the object tracker model. In addition to velocity observations and position observations provided to the tracker and/or based on instantaneous state characteristics such as velocity, bounding box data, etc. the predicted future velocities and their uncertainty scores can intuitively act as an "acceleration observation" indicative of how the actors will change velocities as a given time.

In some implementations, the machine-learned object tracker model is configured to smooth the one or more predicted future velocities to generate the one or more second velocity outputs, wherein the one or more second velocity outputs are smoothed velocity outputs. The object tracker model can thus smooth the prediction to determine smoothed actor velocities (e.g., second velocity outputs). The smoothed actor velocities can be smoothed such that positions, velocities, etc. are refined as more generally amenable to behavior of real-life actors than those of the directly from the perception model. For instance, the predicted future velocities, etc. at different time steps of smoothed actor velocities can be aligned with motion models for the classes of actors. In some implementations, the machine-learned object tracker model is or includes a multi-view tracker model. For instance, the object tracker model can operate on multiple views of sensor data, such as a three-dimensional Euclidean view, a range view, etc.

The method 700 includes, at 730, planning a motion trajectory for the autonomous vehicle based at least in part on the one or more predicted future velocities and the one or more uncertainty scores using a machine-learned motion planning model. For instance, the object tracker model can be accessed by a query-able tracker interface function. The tracker interface function can be queried by downstream components of a planning system (e.g., planning system 250 of FIG. 2) to pass smoothed actor velocities and/or other data related to predicted future trajectories of the actors from the object tracker model to the downstream components.

In some implementations, the object tracker model can be jointly trained with the perception model. For instance, the perception model and the object tracker model can be trained in an end-to-end training regime with training data including sensor data (e.g., multimodal sensor data and/or fused sensor data) labeled with actual state characteristics (e.g., instantaneous and/or future velocities, positions, etc.) of the actors depicted in the sensor data. According to example aspects of the present disclosure, in some implementations, training the perception model and the object tracker model jointly can provide for improved estimates of both current and future velocities as well as object detection capabilities of perception model. For instance, training the perception model jointly with the object tracker model can provide for improved reasoning about bounding box locations and distinguishing between non-moving actors (e.g., temporarily stationary actors) and other non-moving objects.

The method 700 includes, at 740, controlling the autonomous vehicle through one or more onboard control systems based at least in part on the motion trajectory for the autonomous vehicle. For instance, the control system(s) can implement the selected motion plan/trajectory to control the autonomous platform's motion through its environment by following the selected trajectory (e.g., the waypoints included therein). The control system(s) can, for example, translate a motion plan into instructions for the appropriate platform control devices (e.g., acceleration control, brake control, steering control, etc.). By way of example, the control system(s) can translate a selected motion plan into instructions to adjust a steering component (e.g., a steering angle) by a certain number of degrees, apply a certain magnitude of braking force, increase/decrease speed, etc. In some implementations, the control system(s) can communicate with the platform control devices through communication channels including, for example, one or more data buses (e.g., controller area network (CAN), etc.), onboard diagnostics connectors (e.g., OBD-II, etc.), or a combination of wired or wireless communication links. The platform control devices can send or obtain data, messages, signals, etc. to or from the autonomy system(s) (or vice versa) through the communication channel(s).

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method, comprising:
    obtaining sensor data descriptive of an actor in an environment of an autonomous vehicle and (i) at least a portion of the environment of the autonomous vehicle that does not include the actor, the sensor data comprising at least one sweep of the environment of the autonomous vehicle;
    processing the sensor data with a machine-learned perception model to generate a detection of the actor and one or more predicted future velocities;
    aligning, by a machine-learned object tracker model, the one or more predicted future velocities to a motion model respective to a class of the actor to generate one or more second velocity outputs;
    determining a motion trajectory for the autonomous vehicle based at least in part on the one or more second velocity outputs; and
    controlling the autonomous vehicle based at least in part on the motion trajectory.

2. The computer-implemented method of claim 1, further comprising;
    fusing the sensor data from two or more distinct sensor modalities into a common representation of the sensor data,
    wherein processing the sensor data is based at least in part on the common representation of the sensor data, and the sensor data is captured from two or more distinct sensor modalities.

3. The computer-implemented method of claim 1, wherein processing the sensor data further comprises generating, by the machine-learned perception model, one or more uncertainty scores respectively associated with the one or more predicted future velocities.

4. The computer-implemented method of claim 3, further comprising, prior to determining the motion trajectory for the autonomous vehicle, processing the one or more predicted future velocities and the one or more uncertainty scores with the machine-learned object tracker model configured to generate the one or more second velocity outputs, the second velocity outputs comprising data descriptive of velocities of the actor at one or more discrete future timesteps.

5. The computer-implemented method of claim 4, wherein the machine-learned object tracker model is configured to smooth the one or more predicted future velocities to generate the one or more second velocity outputs, and wherein the one or more second velocity outputs comprise smoothed velocity outputs.

6. The computer-implemented method of claim 4, wherein the machine-learned object tracker model comprises a multi-view tracker model and the machine-learned perception model comprises a multi-view perception model.

7. The computer-implemented method of claim 1, wherein the machine-learned perception model is simultaneously trained to generate the detection of the actor and the one or more predicted future velocities.

8. The computer-implemented method of claim 1, wherein the one or more predicted future velocities are respectively associated with one or more discrete future time steps.

9. The computer-implemented method of claim 1, wherein the one or more predicted future velocities are determined in increments up to a prediction end time occurring at a given amount of time after a current time associated with the sensor data.

10. The computer-implemented method of claim 1, wherein processing the sensor data comprises:
determining bounding box data associated with the actor based on the machine-learned perception model, wherein the machine-learned perception model is configured to regress instantaneous velocities of the actor; and
regressing the one or more predicted future velocities by the machine-learned perception model.

11. The computer-implemented method of claim 1, wherein the sensor data comprises a plurality of sweeps of the environment of the autonomous vehicle.

12. The computer-implemented method of claim 11, wherein the sensor data comprises sweep metadata indicative of a relative sweep of the plurality of sweeps in which the sensor data is captured.

13. The computer-implemented method of claim 1, wherein the machine-learned perception model is trained on training data comprising training sensor data labeled with actual state characteristics of one or more actors depicted in the training sensor data.

14. An autonomous vehicle control system, comprising:
one or more processors; and
one or more non-transitory computer-readable media storing executable instructions that cause the one or more processors to perform operations comprising:
obtaining sensor data descriptive of an actor in an environment of an autonomous vehicle and at least a portion of the environment of the autonomous vehicle that does not include the actor, the sensor data comprising at least one sweep of the environment of the autonomous vehicle;
processing the sensor data with a machine-learned perception model to generate a detection of the actor and one or more predicted future velocities;
aligning, by a machine-learned object tracker model, the one or more predicted future velocities to a motion model respective to a class of the actor to generate one or more second velocity outputs;
determining a motion trajectory for the autonomous vehicle based at least in part on the one or more second velocity outputs; and
controlling the autonomous vehicle based at least in part on the motion trajectory.

15. The autonomous vehicle control system of claim 14, wherein the operations further comprise:
fusing the sensor data from two or more distinct sensor modalities into a common representation of the sensor data,
wherein processing the sensor data is based at least in part on the common representation of the sensor data, and the sensor data is captured from two or more distinct sensor modalities.

16. The autonomous vehicle control system of claim 14, wherein processing the sensor data further comprises generating, by the machine-learned perception model, one or more uncertainty scores respectively associated with the one or more predicted future velocities.

17. The autonomous vehicle control system of claim 16, further comprising, prior to determining the motion trajectory for the autonomous vehicle, processing the one or more predicted future velocities and the one or more uncertainty scores with the machine-learned object tracker model configured to generate the one or more second velocity outputs, the second velocity outputs comprising data descriptive of velocities of the actor at one or more discrete future timesteps.

18. An autonomous vehicle, comprising:
one or more processors; and
one or more non-transitory computer-readable media storing executable instructions that cause the one or more processors to perform operations comprising:
obtaining sensor data descriptive of an actor in an environment of the autonomous vehicle and at least a portion of the environment of the autonomous vehicle that does not include the actor, the sensor data comprising at least one sweep of the environment of the autonomous vehicle;
processing the sensor data with a machine-learned perception model to generate a detection of the actor and one or more predicted future velocities;
aligning, by a machine-learned object tracker model, the one or more predicted future velocities to a motion model respective to a class of the actor to generate one or more second velocity outputs;
determining a motion trajectory for the autonomous vehicle based at least in part on the one or more second velocity outputs; and
controlling the autonomous vehicle based at least in part on the motion trajectory.

19. The autonomous vehicle of claim 18, wherein processing the sensor data further comprises generating, by the machine-learned perception model, one or more uncertainty scores respectively associated with the one or more predicted future velocities.

20. The autonomous vehicle of claim 19, further comprising, prior to determining a motion trajectory for the autonomous vehicle, processing the one or more predicted future velocities and the one or more uncertainty scores with the machine-learned object tracker model configured to generate the one or more second velocity outputs, the second velocity outputs comprising data descriptive of velocities of the actor at one or more discrete future timesteps.

* * * * *